(12) United States Patent
Gupta et al.

(10) Patent No.: US 10,511,983 B2
(45) Date of Patent: Dec. 17, 2019

(54) SYSTEM AND METHOD FOR DETERMINING CAPACITY UTILISATION IN A HETEROGENEOUS NETWORK

(71) Applicant: RELIANCE JIO INFOCOMM LIMITED, Mumbai (IN)

(72) Inventors: Ajay Kumar Gupta, Pune (IN); Vishal Vasant Oak, Bangalore (IN); Parwiz Shekalim, Navi Mumbai (IN); Tareq Amin, Navi Mumbai (IN); Mahesh Nayaka Mysore Annaiah, Bangalore (IN); Ravi P Sinha, Thane (IN)

(73) Assignee: RELIANCE JIO INFOCOMM LIMITED, Mumbai, Maharashtra (IN)

( * ) Notice: Subject to any disclaimer, the term of this patent is extended or adjusted under 35 U.S.C. 154(b) by 109 days.

(21) Appl. No.: 15/912,983

(22) Filed: Mar. 6, 2018

(65) Prior Publication Data

US 2018/0262931 A1 Sep. 13, 2018

(30) Foreign Application Priority Data

Mar. 8, 2017 (IN) .............................. 201721008140

(51) Int. Cl.
| | |
|---|---|
| *H04W 24/00* | (2009.01) |
| *H04W 24/08* | (2009.01) |
| *H04W 16/32* | (2009.01) |
| *H04W 24/10* | (2009.01) |
| *H04W 48/12* | (2009.01) |
| *H04W 84/04* | (2009.01) |

(52) U.S. Cl.
CPC ........... *H04W 24/08* (2013.01); *H04W 16/32* (2013.01); *H04W 24/10* (2013.01); *H04W 48/12* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 6,161,008 | A * | 12/2000 | Lee ................... | H04M 3/42229 370/352 |
| 6,215,771 | B1 * | 4/2001 | Turner .................... | H04L 45/08 370/235 |
| 9,154,398 | B1 * | 10/2015 | Shpilyuck ............... | H04L 43/16 |
| 2018/0077030 | A1 * | 3/2018 | Lauer .................. | G06F 3/04842 |

* cited by examiner

*Primary Examiner* — Ayanah S George
(74) *Attorney, Agent, or Firm* — Ladas & Parry, LLP (57) ABSTRACT

Embodiments of the present invention relate to a system and method for determining a capacity utilisation of at least one of a cluster [104] and a base station [102]. More particularly, the embodiments may disclose a method for determining the capacity utilisation by receiving at least one message from at least one user equipment [110], wherein the at least one user equipment [110] belongs to the at least one cluster [104] having at least one cluster identifier and the at least one message includes uplink data and downlink data of the at least one user equipment [110]; generating a capacity utilisation list for said at least one cluster [104]; updating the capacity utilisation list with the uplink data and the downlink data; and determining a capacity utilisation for at least one of the cluster [104] and the base station [102] based on the uplink data and the downlink data.

13 Claims, 5 Drawing Sheets

SYSTEM AND METHOD FOR DETERMINING CAPACITY UTILISATION IN A HETEROGENEOUS NETWORK

CROSS REFERENCE TO RELATED APPLICATIONS

This application claims the benefit of and priority to Indian Patent Application No. 201721008140 filed on Mar. 8, 2017, the disclosure of which is hereby incorporated herein by reference.

TECHNICAL FIELD

Embodiments of the present invention generally relate to communication systems. In particular, embodiments of the present invention relate to a system and method for determining a capacity utilisation of various entities in a heterogeneous network.

BACKGROUND

In a traditional cellular deployment, suitable powered macro base stations are being deployed to cover sufficiently large areas to provide cellular coverage. However, with the deployment of macro base stations only, it generally suffers with quick capacity degradation with the increase in number of user equipment operating in the macro base stations coverage areas. As a result, cellular operators are placing one or more Wi-Fi access points and small cells at multiple strategic locations points along with the macro base stations deployment to serve large number of user equipment operating in that particular location/area. This kind of network is generally termed as heterogeneous network (referred hereinafter as HetNet). In the HetNet, the macro base station coverage could be used for wide area overlay mobility coverage, while small cells along with Wi-Fi access point's coverage could be used for mobile capacity upgrade For the typical HetNet, strategic locations/areas for such Wi-Fi access points and small cellular cells generally include areas with high density of user equipments such as shopping malls, airports, railway/bus stations, colleges, etc. Further, these locations might include area with dead-spots or areas with macro base station having low signal strength such as indoor establishments or peripheral locations of the macro coverage area. Therefore, the usage of such HetNet provides better network coverage and provides the increased data capacity that enhance the overall user's mobile broadband experience.

As a part of HetNet deployment strategy, the cellular operators are increasingly complementing their macro cellular networks by installing clusters of standalone small cells, standalone access points, and WiFi integrated small cells. These clusters are being put at public/private sites (called as hotspot sites), within a macro coverage area, where the user density is relatively higher. Such HetNet deployment strategy helps the operators to offload load from the macro base station network, thereby allowing them to efficiently expand on the wireless capacity and coverage fronts in order to meet the increasing demand of mobile broadband from the consumers.

However, in order to achieve the maximum effectiveness from the deployment of the HetNet, the cellular operators need to know the capacity utilization of the macro base stations at the hotspot sites. This helps the cellular operators for planning to deploy optimum small cells/access points. Further, indicators are linked to the macro base station capacity utilization at the hotspot sites reveals the health of the small cells/access points installed at those sites. In an instance where enough number of the small cells/access points are installed at the hotspot site and the capacity utilization of the macro base station is still high, this could potentially mean that either the small cells/access points are not functional or the coverage is not planned meticulously for such site, or the offload function between the macro base station and the small cells/access points is not working seamlessly.

Currently, the cellular operators generally rely on aggregated capacity utilization of the small cells/access points to predict for further capacity expansion. The prediction of further small cells/access points expansion generally holds true when the aggregated capacity utilization of the small cells/access points starts hitting an upper threshold of the maximum available capacity available from the small cells/access points. However, such a prediction, based on aggregated capacity utilization of the small cell/access points does not provide any insight to the cellular operators as to how much additional small cell capacity needs to be provisioned for offload.

Further, the cellular operators have access to the small cells/access points related Key Performance Indicators (KPIs) for the users that are offloaded from the macro base station. These KPIs only reveals the cellular operators whether the small cells/access points are optimally serving the offloaded users or not. However, cellular operators presently do not have any insight into whether their installed small cells/access points are efficiently executing the offload from the overlapping macro base stations or not.

Therefore, in view of above-mentioned drawbacks in the existing solutions, there is a need for an efficient and effective approach for determining capacity utilization of the macro base station where the small cells/access points are deployed to offload the macro base station.

SUMMARY

This section is provided to introduce certain aspects of the present invention in a simplified form that are further described below in the detailed description. This summary is not intended to identify the key features or the scope of the claimed subject matter.

Embodiments of the present invention may relate to a method for determining a capacity utilisation of at least one of at least one cluster and a base station in a heterogeneous network, wherein the method is being performed by the base station, the method comprising: receiving at least one broadcast/unicast message from at least one user equipment, wherein the at least one user equipment belongs to the at least one cluster having at least one cluster identifier, the at least one broadcast message includes the at least one cluster identifier corresponding to said at least one cluster, and the at least one broadcast message includes an uplink data and a downlink data of the at least one user equipment; generating a capacity utilisation list for said at least one cluster, wherein the capacity utilisation list is generated on the basis of said at least one cluster identifier; updating the capacity utilisation list with the uplink data and the downlink data of the at least one user equipment, wherein the capacity utilisation list is updated on the basis of the at least one cluster identifier; and determining a capacity utilisation for at least one of each of the at least one cluster and the base station, wherein the capacity utilisation is determined based on the uplink data and the downlink data received from the at least one user equipment.

Embodiments of the present invention may relate to a base station for determining a capacity utilisation of at least one of at least one cluster and a base station in a heterogeneous network, the base station comprising: a communication module configured to receive at least one broadcast/unicast message from at least one user equipment, wherein the at least one user equipment belongs to the at least one cluster having at least one cluster identifier, the at least one broadcast message includes the at least one cluster identifier corresponding to said at least one cluster, and the at least one broadcast message includes an uplink data and a downlink data of the at least one user equipment; a capacity utilisation module configured to generate a capacity utilisation list for said at least one cluster, wherein the capacity utilisation list is generated on the basis of said at least one cluster identifier; and updating the capacity utilisation list with the uplink data and the downlink data of the at least one user equipment, wherein the capacity utilisation list is updated on the basis of the at least one cluster identifier; and an analytics unit configured to determine a capacity utilisation for at least one of each of at least one cluster and the base station, wherein the capacity utilisation is determined based on the uplink data and the downlink data received from the at least one user equipment.

BRIEF DESCRIPTION OF THE DRAWINGS

The accompanying drawings, which are incorporated herein, and constitute a part of this present invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that disclosure of such drawings includes disclosure of electrical components or circuitry commonly used to implement such components.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention encompasses a system and a method for determining a capacity utilization of at least one of a cluster and a base station, wherein the capacity utilization is determined by the base station. Further, the cluster comprises of at least one a access point and/or a small cell and a user equipment is connected to the base station and the cluster.

As used herein, the base station may serve a cellular network for providing voice services (calls) and the data services to the user equipment. The base station may include, but not limited to, a macro cell site, a Node B, an eNode B, a radio network controller, and any such entity obvious to a person skilled in the art.

As used herein, the small cell may be a micro cellular station for providing cellular network to the user equipment. The small cell is present within the cellular network of the base station and latched to the base station. The small cell may include, but not limited to, a base station controller, a base transceiver station and any such entity obvious to a person skilled in the art.

As used herein, the access point may serve a Wi-Fi network to the user equipment using which the user equipment avails call and data services (such as internet) by a wireless connection established between the user equipment and the access point via a Wi-Fi network.

As used herein, the capacity utilization may refer to the utilization of the base station and/or the cluster connected to the base station. Such utilization may include, but not limited to, network coverage of the base station and/or the cluster, traffic (call, data and other services) handled by the base station and/or the cluster, traffic (call, data and other services) offloaded from the base station to the cluster and such utilization that is obvious to a person skilled in the art.

As used herein, the user equipment may be a computing device that is latched to the base station and/or the small cell and thus, receives voice and data services from the base station and/or the small cell. Further, the user equipment may also get connected to the Wi-Fi access point for availing the voice and data services. The user equipment may have a processor, a display, a memory and an input means such as a hard keypad and/or a soft keypad. The user equipment may include, but not limited to, a mobile phone, a tablet, a wearable device, a phablet, a personal digital assistance and any such device obvious to a person skilled in the art.

Figure 1:
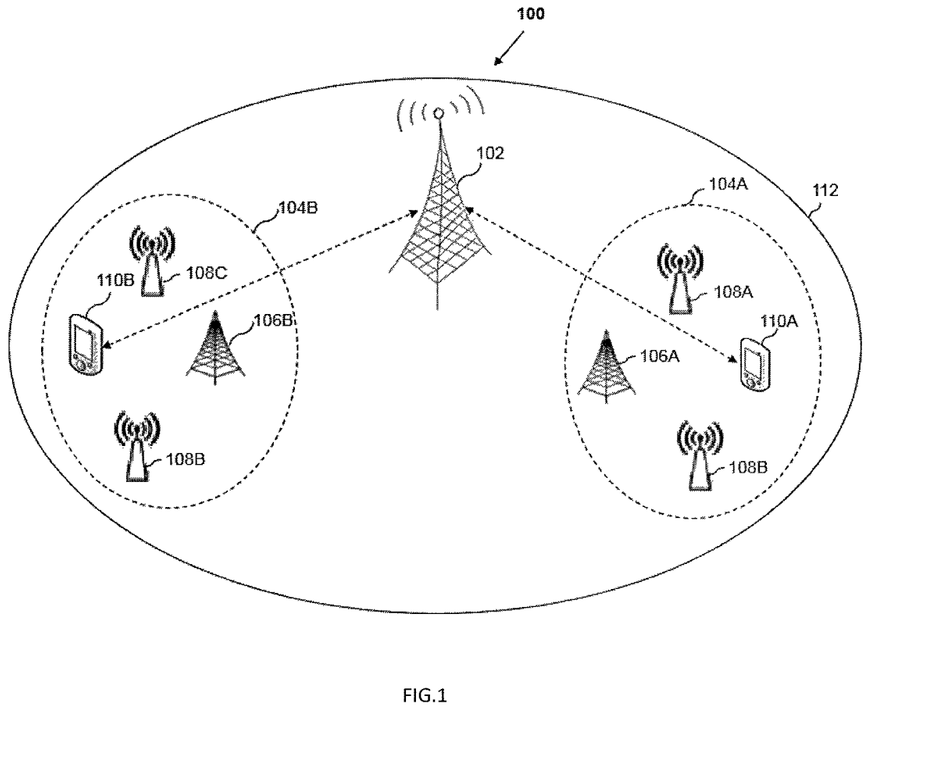
FIG. 1 illustrates an exemplary system architecture [100] for determining a capacity utilization of at least one of a cluster and a base station, in accordance with an embodiment of the present invention.

As illustrated in FIG. 1, the present invention illustrates an exemplary system architecture [100] for determining a capacity utilization of at least one of a cluster and a base station, in accordance with an embodiment of the present invention, depicting: a base station [102] with a cellular coverage range [112], a first cluster [104A] includes a first small cell [106A], a first access point [108A], a second access point [108B], and a first user equipment [110A]. Similarly, a second cluster [104B] includes a second small cell [106B], a third access point [108C], a fourth access point [108D], and a second user equipment [110B].

The user equipments [110] as used herein and throughout the specification corresponds to either the first user equipment [110A], the second user equipment [110B] and a combination thereof. Similarly, the small cells [106] as used herein and throughout the specification corresponds to either the first small cell [106A], the second small cell [106B], and a combination thereof. Also, the access points [108] as used herein and throughout the specification corresponds to either the first access point [108A], the second access point [108B], the third access point [108C], the fourth access point [108D], and a combination thereof.

The first user equipment [110A] present in the cellular coverage range [112] may avail services using at least one of the first small cell [106A], the first access point [108A], and the second access point [108B]. Further, the second user equipment [110B] present in the cellular coverage range [112] may avail services using at least one of the second small cell [106B], the third access point [108C], and the fourth access point [108D]. The first user equipment [110A] and the second user equipment [110B] may connect to the base station [102].

The first small cell [106A], the first access point [108A], and the second access point [108B] present in the first cluster [104A] may periodically broadcast/unicast a unique cluster identifier [C1] in the air. Similarly, the second small cell [106B], the third access point [108C], and the fourth access point [108D] present in the second cluster [104B] may periodically broadcast/unicast a unique cluster identifier [C2] in the air. Such cluster identifiers [C1, C2] may be broadcasted/unicasted as part of at least one of HESSID (called as homogenous ESS identifier) from the small cells [106] via system information blocks (SIBs) on a broadcast/unicast channel and from the access points [108] in a broadcast beacon frame.

The first user equipment [110A] present in the vicinity of the first cluster [104A] may get latched to the base station [102] and transmit the unique cluster identifier [C1] of the first cluster [104A] to the base station [102] using a broadcast/unicast message. In an embodiment, the first user equipment [110A] may transmit the unique cluster identifier [C1] to the base station [102] in an event the signal strength from at least one of the first small cell [106A] and the access point [108A, 108B] is above a pre-defined threshold. Such broadcast/unicast message may include, but not limited to, the unique cluster identifier [C1], information related to the first small cell [106A] and the access point [108A, 108B], information related to signal strength etc.

On receiving the broadcast/unicast message from the first user equipment [110A], the base station [102] may parse the broadcast/unicast message for identifying the unique cluster identifier [C1] and may generate a capacity utilization list for the identified cluster identifier [C1]. On identifying the unique cluster identifier [C1], the base station [102] may tag the first user equipment [110A] with the first cluster [104A]. In an embodiment, the base station [102] may tag the user equipment [110] with the at least one cluster [104] when the base station [102] receives a number of broadcast/unicast messages from the user equipment [110] above a pre-defined threshold. Such pre-defined threshold may be either dynamically or statistically pre-configured by the cellular operators. Moreover, the base station [102] may maintain a counter value for counting number of user equipment currently associated/tagged with the at least one cluster [104]. In an embodiment, the base station [102] may increment the counter value by one in an event the user equipment [110A] is tagged with the at least one cluster [104A]. In another embodiment, the base station [102] may decrement the counter value by one in an event the user equipment [110A] is un-tagged with the at least one cluster [104A]. Moreover, the base station [102] may un-tag the user equipment [110A] with the at least one cluster [104A] in an event the base station [102] does not receive any broadcast/unicast message from the user equipment [110A] after a pre-determined period of time. Once the base station [102] tags the first user equipment [110A] with the unique cluster identifier [C1], the base station [102] retrieves, from the broadcast/unicast message, an uplink data and a downlink data of the first user equipment [110A] and may start accumulating/updating the uplink data and the downlink data in the capacity utilization list. Further, the base station [102] may periodically receive one or more broadcast/unicast message from the first user equipment [110A] including the unique cluster identifier [C1], an updated uplink data and an updated downlink data. Using the one or more broadcast/unicast message, the base station [102] may periodically update the capacity utilization list using the updated uplink data and the updated downlink data associated with the first user equipment [110A], based on the unique cluster identifier [C1]. Also, the one or more broadcast/unicast messages may also be received from the small cells [106] and/or the access points [108].

Similarly, the base station [102] may accumulate uplink data and downlink data in the capacity utilization list for each of the user equipment [110] present in the cellular coverage range [112] and associated with the at least one cluster [104]. In specific, the base station [102] may accumulate uplink data and downlink data from the first user equipment [110A] and the second user equipment [110B] associated with the first cluster [104A]. Also, the base station [102] may accumulate uplink data and downlink data from the from the third user equipment [110C] and the fourth user equipment [110D] associated with the second cluster [104B].

As used herein, the uplink data and the updated uplink data may refer to an amount of data (in bytes/bits) transmitted from the user equipment [110] to the base station [102]/small cell [106]/access point [108].

As used herein, the downlink data and the updated downlink data may refer to an amount of data (in bytes/bits) transmitted from the base station [102]/small cell [106]/access point [108] to the user equipment [110].

Further, the base station [102] may accumulate uplink data and downlink data for each of the user equipment [110] in a single capacity utilization list, wherein the single capacity utilization list is associated with each of the cluster [104]. Alternatively, the base station [102] may accumulate uplink data and downlink data in one or more capacity utilization list, wherein each capacity utilization list is unique and associated a cluster [104]. Such capacity utilization list is removed in an event the counter value of the user equipment [110] reaches zero. In another words, the capacity utilization list for the at least one cluster [104] is removed when there does not exist any tagged user equipment [110] for the at least one cluster [104].

Once the base station may accumulate the uplink data and the downlink data, the base station [102] may aggregate uplink data and downlink data of each of the user equipment [110] associated with the at least one cluster [104]. Such aggregation may include aggregating the uplink data and downlink data of each of the user equipment [110] associated with the at least one cluster [104] or aggregating the uplink data and downlink data of each of the user equipment [110] associated with the base station [102]. This aggregation of the uplink data and the downlink data determines capacity utilization of the at least one of the base station [102], the small cell [106], and the access point [108]. Such aggregated uplink data and the downlink data corresponds to one or more capacity values for each of the at least one cluster [104].

An exemplary capacity utilization list is illustrated in exemplary Table 1 below for determining capacity utilization of the at least one of the base station [102] and the cluster [104] (including small cell [106] and/or the access point [108]). The exemplary capacity utilization list (i.e. Table 1) is a single list generated and maintained by the base station [102] for each of the user equipment [110] associated with the at least one cluster [104].

TABLE 1

| Cluster | Unique Cluster Identifier | User Equipment (UE) | Accumulated UE Uplink Data | Accumulated UE Downlink Data | Aggregated Uplink Capacity Value | Aggregated Downlink Capacity Value |
|---------|---------------------------|---------------------|----------------------------|------------------------------|----------------------------------|-----------------------------------|
| 104A    | C1                        | 110A                | 100 MB                     | 50 MB                        | 110 MB                           | 60 MB                             |
| 104A    | C1                        | 110B                | 10 MB                      | 10 MB                        | 110 MB                           | 60 MB                             |
| 104B    | C2                        | 110C                | 500 MB                     | 20 MB                        | 510 MB                           | 1020 MB                           |
| 104B    | C2                        | 110D                | 10 MB                      | 1000 MB                      | 510 MB                           | 1020 MB                           |

Another exemplary capacity utilization list is illustrated in exemplary Table 2A below for determining capacity utilization of the at least one of the base station [102] and the cluster [104] (including small cell [106] and/or the access point [108]). The exemplary capacity utilization list is generated and maintained by the base station [102] and is unique since the capacity utilization list is associated with the first cluster [104A].

TABLE 2A

| Cluster | Unique Cluster Identifier | User Equipment (UE) | Accumulated UE Uplink Data | Accumulated UE Downlink Data | Aggregated Uplink Capacity Value | Aggregated Downlink Capacity Value |
|---------|---------------------------|---------------------|----------------------------|------------------------------|----------------------------------|-----------------------------------|
| 104A    | C1                        | 110A                | 100 MB                     | 50 MB                        | 110 MB                           | 60 MB                             |
| 104A    | C1                        | 110B                | 10 MB                      | 10 MB                        | 110 MB                           | 60 MB                             |

Another exemplary capacity utilization list is illustrated in exemplary Table 2B below for determining capacity utilization of the at least one of the base station [102] and the cluster [104] (including small cell [106] and/or the access point [108]). The exemplary capacity utilization list is generated and maintained by the base station [102] and is unique since the capacity utilization list is associated with the second cluster [104B].

TABLE 2B

| Cluster | Unique Cluster Identifier | User Equipment (UE) | Accumulated UE Uplink Data | Accumulated UE Downlink Data | Aggregated Uplink Capacity Value | Aggregated Downlink Capacity Value |
|---------|---------------------------|---------------------|----------------------------|------------------------------|----------------------------------|-----------------------------------|
| 104B    | C2                        | 110C                | 500 MB                     | 20 MB                        | 510 MB                           | 1020 MB                           |
| 104B    | C2                        | 110D                | 10 MB                      | 1000 MB                      | 510 MB                           | 1020 MB                           |

As seen in the exemplary Table 1, Table 2A, Table 2B, the capacity utilization of the first cluster [104A] is determined by using aggregated uplink capacity values and the aggregated downlink capacity values for the first cluster [104A], which are 110 MB and 60 MB respectively. Thus, the capacity utilization of the first cluster [104A] is determined as 170 MB, approximately. Similarly, the capacity utilization of the second cluster [104B] is determined by using aggregated uplink capacity values and the aggregated downlink capacity values for the second cluster [104B], which are 510 MB and 1020 MB respectively. Thus, the capacity utilization of the second cluster [104B] is determined as 1530 MB, approximately. Thereby, the capacity utilization of the base station [102] may be determined as aggregation of the uplink capacity values and the downlink capacity values for the first cluster [104A] and the second cluster [104B] which is approximately, 1700 MB. Although, the present invention stipulates an exemplary way/method for determining capacity utilization of at least one of the base station [102] and the cluster [104]; however, it should not be considered as limiting and any possible way to determine capacity utilization of the base station [102] and the cluster [104]. Further, any other possible way/method may be used for determining capacity utilization of the base station [102] and the cluster [104] that is obvious to a person skilled in the art. Further, the values such as the uplink data, the downlink data, the aggregated uplink capacity values and the aggregated downlink capacity values, as disclosed in the present invention, may be expressed in units including but not limited to megabytes [MB], Gigabyte [GB], Terabyte [TB] and in any other units that is obvious to a person skilled in the art.

Figure 2:
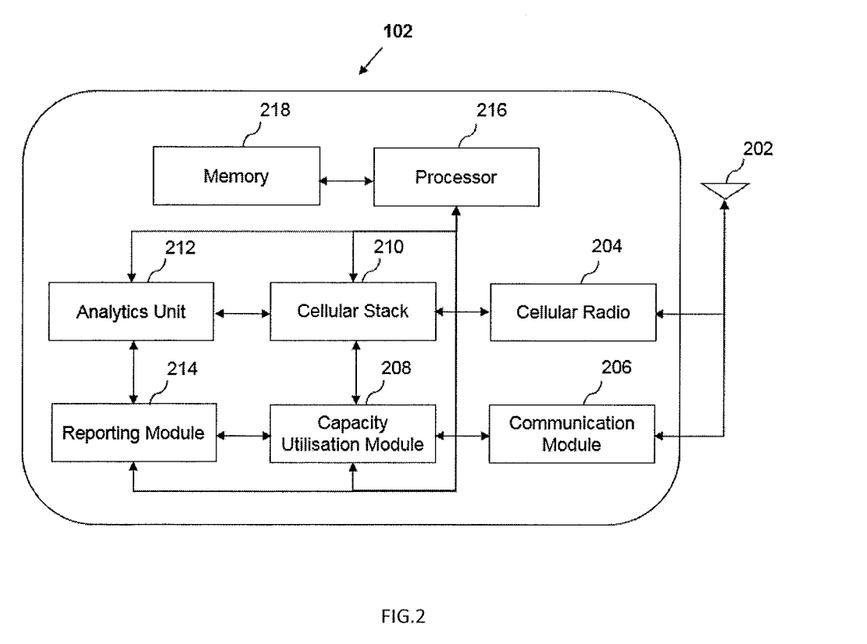
FIG. 2 illustrates an exemplary base station [102], in accordance with an exemplary embodiment of the present invention.

As illustrated in FIG. 2, the present invention illustrates an exemplary base station [102] for determining a capacity utilization of at least one of the cluster [104] and the base station [102], in accordance with an exemplary embodiment of the present invention, the base station [102] comprising, but not limited to: an antenna [202], a cellular radio [204], a communication module [206], a capacity utilization module [208], a cellular stack [210], an analytics unit [212], a reporting unit [214], a processor [216] and a memory [218].

The antenna [202] may be configured to transmit radio signals to provide the cellular coverage range to the user equipment [110] for providing various cellular services. Further, the base station may further utilize the antenna [202] to communicate with the small cells [106] and the access points [108].

The cellular radio [204], in communication with the cellular stack [210], may be configured to provide one or more cellular functionalities to the user equipment [110]. Such cellular functionalities may include, but not limited to, resources allocation, the data services and the voice services. The cellular radio [204], in communication with the cellular stack [210], may be further configured to communicate with the user equipment [110] through the antenna [202]. Such communication may include, but not limited to, periodically receiving the one or more broadcast/unicast messages from at least one of the user equipment [110] and the small cells [106] including the uplink data as well as the downlink data etc.

The communication module [206] may be configured to communicate with the access point [108] through the antenna [202]. Such communication may include, but not limited to, periodically receiving the one or more broadcast/unicast messages from the access point [108] including the uplink data as well as the downlink data, etc.

The capacity utilization module [208] may parse the broadcast/unicast message for identifying the unique cluster identifier [C1, C2] and may be configured to generate as well as maintain the capacity utilization list for the unique cluster identifier [C1, C2]. On identifying the unique cluster identifier [C1, C2], the capacity utilization module [208] may tag the user equipment [110] with the at least one cluster [104].

The analytics unit [212] may be configured to retrieve, from the broadcast/unicast message, the uplink data and the downlink data of the user equipment [110] and may periodically start accumulating/updating the uplink data and the downlink data in the capacity utilization list. The analytics unit [212] may also be configured to aggregate the uplink data and the downlink data of each of the user equipment [110] associated with the at least one cluster [104]. Such aggregation may include aggregating the uplink data and downlink data of each of the user equipment [110] associated with the at least one cluster [104] or aggregating the uplink data and downlink data of each of the user equipment [110] associated with the base station [102]. This aggregation of the uplink data and the downlink data determines capacity utilization of the at least one of the base station [102], the small cell [106], and the access point [108]. Such aggregated uplink data and the downlink data corresponds to one or more capacity values for each of the at least one cluster [104]. In specific, the capacity utilization of the at least one cluster [104] is determined using the aggregated uplink capacity values and the aggregated downlink capacity values for the at least one cluster [104]. Further, the capacity utilization of the base station [102] may be determined as a further aggregation of the aggregated uplink capacity values and the aggregated downlink capacity values for each of the cluster [104]. The reporting unit [214] may be configured to graphically represent the capacity utilization of at least one of the base station [102] the cluster [104] in a time scale manner using at least one of charts, graphs, plots, trends, and such representation that is obvious to a person skilled in the art. Such graphically representation may utilize at least one of the aggregated uplink capacity values, the aggregated downlink capacity values for each of the cluster [104], the uplink capacity values and downlink capacity values.

The processor [216] may communicate with the cellular radio [204], the cellular stack [210], and the communication module [206] and may be configured to perform operations such as, but not limited to, determining aggregation of the uplink capacity values and the downlink capacity values, determining capacity utilization of at least one of the base station [102] the cluster [104]. The processor [216] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [218], coupled to the processor [216], may be configured to store and manage multiple data sets including the capacity utilization list, the list of user equipments [110], etc. The memory [218] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

Figure 3:
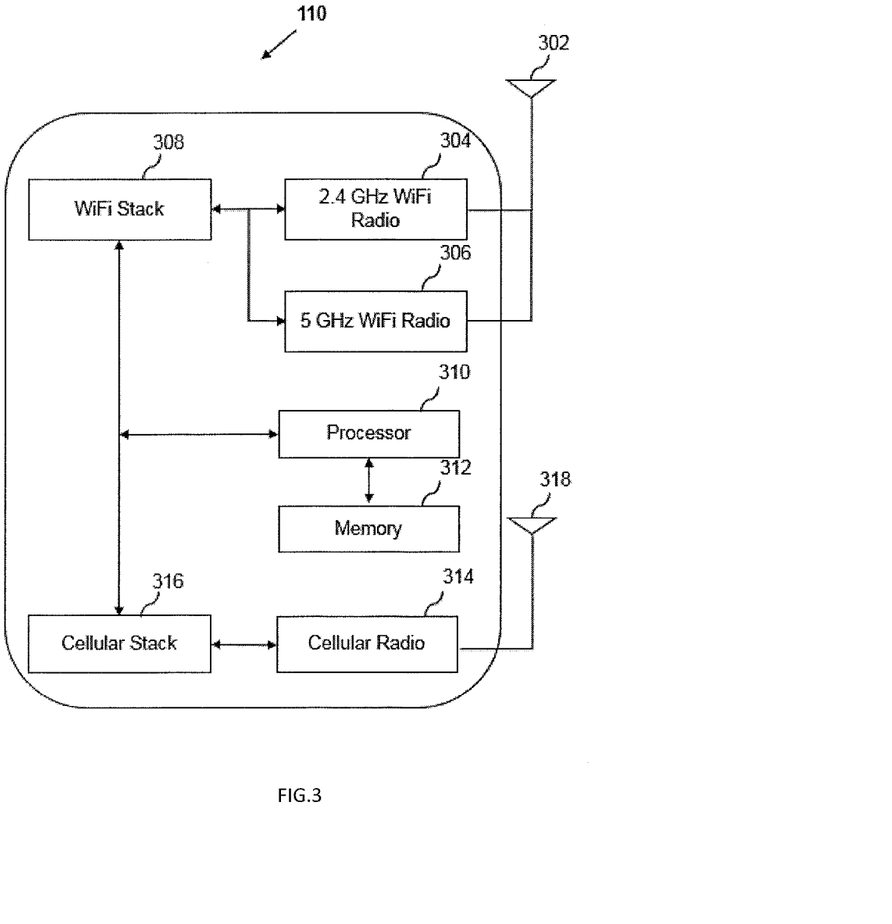
FIG. 3 illustrates an exemplary user equipment [110], in accordance with an exemplary embodiment of the present invention.

As illustrated in FIG. 3, the present invention illustrates an exemplary user equipment [110], in accordance with an exemplary embodiment of the present invention, the exemplary user equipment [110] comprising, but not limited to: an antenna [302], a WiFi stack [308] connected with a 2.4 GHz WiFi radio [304] and a 5 GHz WiFi radio [306], a processor [310] and a memory [312], a cellular radio [314], and a cellular stack [316].

The antenna [302] may be configured to receive radio signals from the base station [102], the small cells [106] and the WiFi signals from the access points [108]. The antenna [302] may further communicate with 2.4 GHz WiFi radio [304], the 5 GHz WiFi radio [306], and the cellular radio [314].

The WiFi stack [308] connected with the 2.4 GHz WiFi radio [304] and the 5 GHz WiFi radio [306], may be configured to communicate with the access points [108] for receiving the wireless services, through the antenna [302], from the access points [108]. Such communication may include, but not limited to, receiving the cluster identifier [C1, C2] being broadcasted/unicasted by the access points [108], authentication set up between the user equipment [110] and the access points [108], and availing data and call services through the access points [108]. Further, the access points [108] may be configured to provide the wireless services through IEEE 802.11b/a/g/an/ac standards.

The cellular radio [314], in communication with the cellular stack [316], may be configured to receive the cellular network from the base station [102]. The cellular radio [314], in communication with the cellular stack [316], may be further configured to communicate with the base station [102] and the small cells [106]. Such communication may include, but not limited to, transmitting the one or more broadcast/unicast messages to the base station [102], transmitting the cluster identifier [C1, C2] to the base station [102], periodically transmitting the uplink data as well as the downlink data the base station [102].

The processor [310] may communicate with the WiFi stack [308] and the cellular stack [316] and may be configured to perform operations by referring to the data stored in the memory [316]. The processor [314] as used herein may include, but is not limited to, a processor or set of processors such as a microprocessor, a multi-core microprocessor, a digital signal processor, a collection of electronic circuits, or a combination thereof and may be configured to perform operations/functions as described herein.

The memory [312], coupled to the processor [310], may be configured to store and manage multiple data sets including information relating to the base station [102], the small cells [106] and the access points [108] etc. The memory [312] may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

Figure 4:
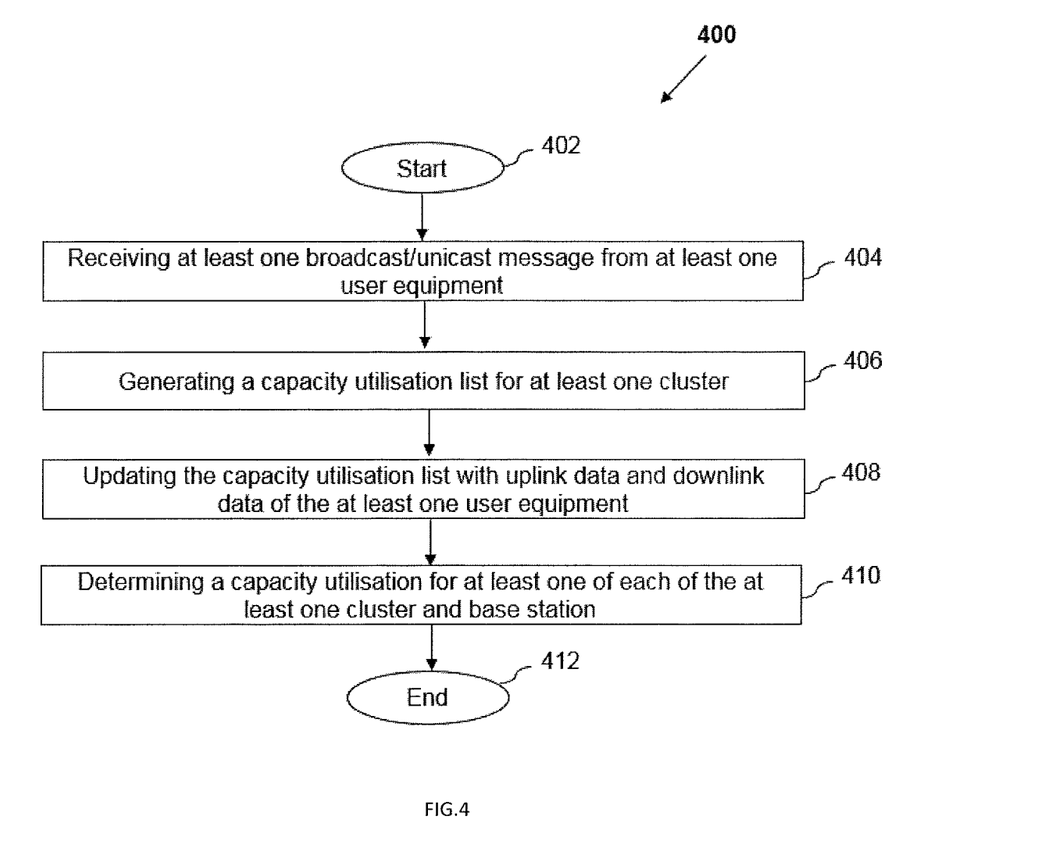
FIG. 4 illustrates an exemplary method flow diagram [400] for determining a capacity utilization of at least one of a cluster and a base station, in accordance with an embodiment of the present invention.

As illustrated in FIG. 4, the present invention illustrates an exemplary method flow diagram [400] for determining the capacity utilization of at least one of the cluster [104] and the base station [102], in accordance with an embodiment of the present invention, wherein the method being performed by the base station [102]. The method flow initiates at step 402.

At step 404, the base station [102] may receive broadcast/unicast message from the first user equipment [110A] present in the vicinity of the first cluster [104A]. At step 406, the base station [102], on receiving the broadcast/unicast message from the first user equipment [110A], may parse the broadcast/unicast message for identifying the unique cluster identifier [C1] and may generate the capacity utilization list based on the unique cluster identifier [C1]. On identifying the unique cluster identifier [C1], the base station [102] may tag the first user equipment [110A] with the first cluster [104A].

At step 408, the base station [102], after tagging the first user equipment [110A] with the unique cluster identifier [C1], may retrieve, from the broadcast/unicast message, the uplink data and the downlink data of the first user equipment [110A] and may start accumulating/updating the uplink data and the downlink data in the capacity utilization list. Further, the base station [102] may periodically receive one or more broadcast/unicast message from the first user equipment [110A] including the unique cluster identifier [C1], an updated uplink data and an updated downlink data. Using the one or more broadcast/unicast message, the base station [102] may periodically accumulate/update the updated uplink data and updated downlink data associated with the first user equipment [110A] in the capacity utilization list, based on the unique cluster identifier [C1].

At step 410, the base station [102] may aggregate the uplink data and the downlink data of each of the user equipment [110] associated with the at least one cluster [104]. Such aggregation may include aggregating the uplink data and downlink data of each of the user equipment [110] associated with the at least one cluster [104] or aggregating the uplink data and downlink data of each of the user equipment [110] associated with the base station [102]. This aggregation of the uplink data and the downlink data determines capacity utilization of the at least one of the base station [102], the small cell [106], and the access point [108]. Such aggregated uplink data and the downlink data corresponds to one or more capacity values for each of the at least one cluster [104]. In specific, the capacity utilization of the at least one cluster [104] is determined using the aggregated uplink capacity values and the aggregated downlink capacity values for the at least one cluster [104]. Further, the capacity utilization of the base station [102] may be determined as a further aggregation of the aggregated uplink capacity values and the aggregated downlink capacity values for each of the cluster [104]. Then, the method [400] may end at step 412.

Figure 5:
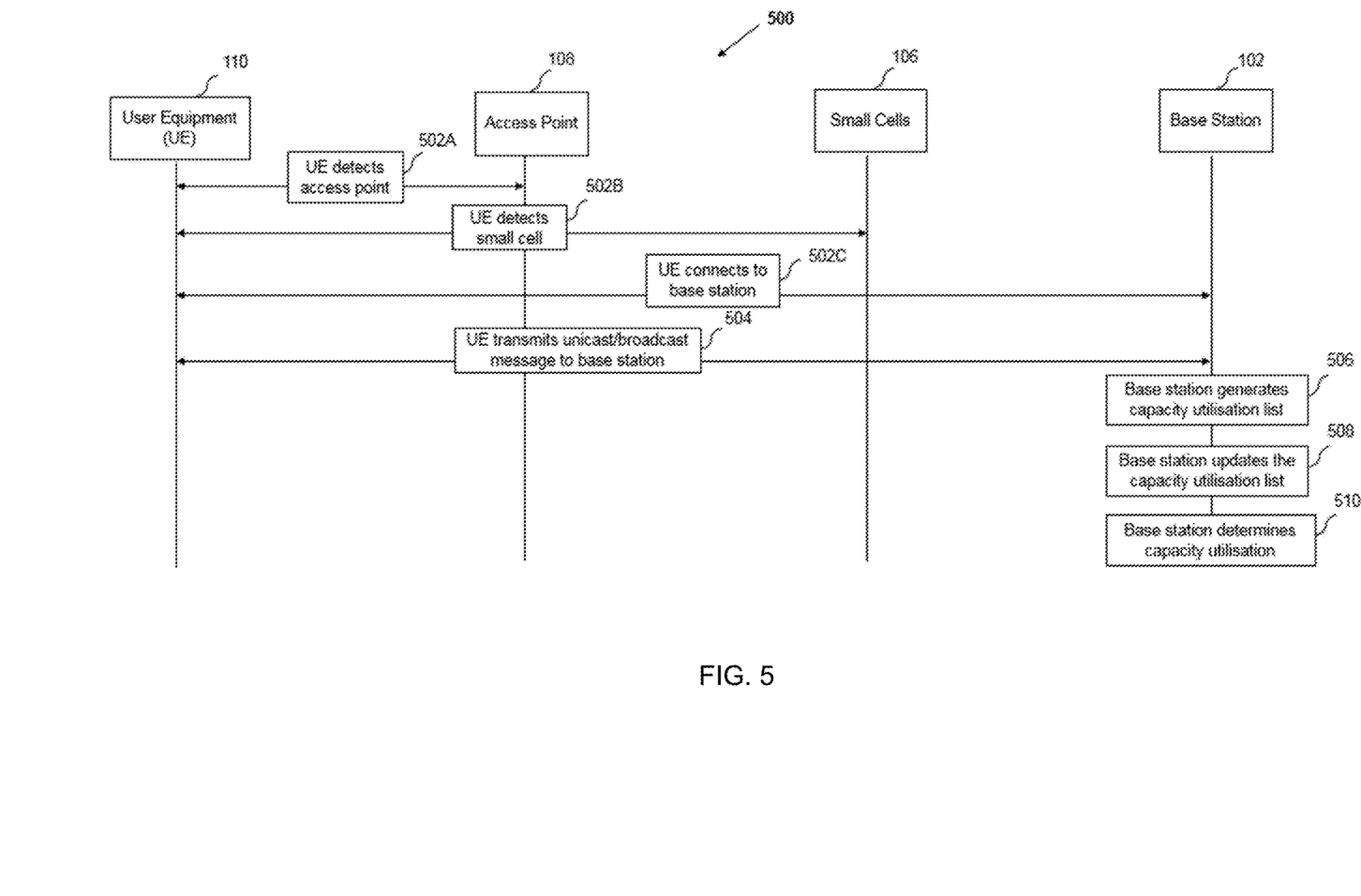
FIG. 5 illustrates an exemplary signaling flow diagram [500] for determining a capacity utilization of at least one of a cluster and a base station, in accordance with an embodiment of the present invention.

As illustrated in FIG. 5, the present invention illustrates an exemplary signaling flow diagram [500] for determining the capacity utilization of at least one of the cluster [104] and the base station [102], in accordance with an embodiment of the present invention.

At step 502A, the first user equipment [110A] present in the vicinity of the first cluster [104A] may detect access point [108A, 108B] in the first cluster [104A] using broadcast beacons.

At step 502B, the first user equipment [110A] present in the vicinity of the first cluster [104A] may detect first small cell [106A] in the first cluster [104A] using information in SIB on broadcast channel.

At step 502C, the first user equipment [110A] may connect or latch with the base station [102].

At step 504A, the first user equipment [110A] present in the vicinity of the first cluster [104A] may transmit the broadcast/unicast message to the base station [102] including the unique cluster identifier [C1] of the first cluster [104A].

At step 506, the base station [102], on receiving the broadcast/unicast message from the first user equipment [110A], may parse the broadcast/unicast message for identifying the unique cluster identifier [C1] and may generate the capacity utilization list for the unique cluster identifier [C1]. On identifying the unique cluster identifier [C1], the base station [102] may tag the first user equipment [110A] with the first cluster [104A].

At step 508, the base station [102], after tagging the first user equipment [110A] with the unique cluster identifier [C1], may retrieve, from the broadcast/unicast message, the uplink data and the downlink data of the first user equipment [110A] and may start accumulating/updating the uplink data and the downlink data in the capacity utilization list. Further, the base station [102] may periodically receive one or more broadcast/unicast message from the first user equipment [110A] including the unique cluster identifier [C1], an updated uplink data and an updated downlink data. Using the one or more broadcast/unicast message, the base station [102] may periodically accumulate/update the updated uplink data and updated downlink data associated with the first user equipment [110A] in the capacity utilization list, based on the unique cluster identifier [C1].

At step 510, the base station [102] may aggregate the uplink data and the downlink data of each of the user equipment [110] associated with the at least one cluster [104]. Such aggregation may include aggregating the uplink data and downlink data of each of the user equipment [110] associated with the at least one cluster [104] or aggregating the uplink data and downlink data of each of the user equipment [110] associated with the base station [102]. This aggregation of the uplink data and the downlink data determines capacity utilization of the at least one of the base station [102], the small cell [106], and the access point [108]. Such aggregated uplink data and the downlink data corresponds to one or more capacity values for each of the at least one cluster [104]. In specific, the capacity utilization of the at least one cluster [104] is determined using the aggregated uplink capacity values and the aggregated downlink capacity values for the at least one cluster [104]. Further, the capacity utilization of the base station [102] may be determined as a further aggregation of the aggregated uplink capacity values and the aggregated downlink capacity values for each of the cluster [104

Although, the present invention has been described with respect to the exemplary system architecture [100] where the first user equipment [110A] associated with the first cluster [104A] may transmit the broadcast/unicast message to the base station [102]; however, it will be appreciated by those skilled in the art that the present invention encompasses any user equipment that may be associated with any cluster and may transmit the broadcast/unicast message to the base station [102] and all such scenarios and embodiments shall be encompassed by the present invention.

The units, interfaces, modules, and components depicted in the figures and described herein may be present in the form of a hardware, a software and a combination thereof. Connection/s shown between these units/components/modules/interfaces in the exemplary system architecture [100], the base station [102], the first cluster [104A] (including the first small cell [106A], the first access point [108A], the second access point [108B]), the first user equipment [110A], as well as the second cluster [104B] (including the second small cell [106B], the third access point [108C], the fourth access point [108D]) and the second user equipment [1108] may interact with each other through various logical links and/or physical links. Further, the units/components/modules/interfaces may be connected in other possible ways. Though a limited number of the base station [102], the clusters [104], the user equipments [110], the small cells [106], the access points [108], units, interfaces, modules and components, have been shown in the figures; however, it will be appreciated by those skilled in the art that the exemplary system architecture [100], the base station [102], the clusters [104], the user equipments [110], the small cells [106], the access points [108] of the present invention encompasses any number and varied types of the entities/elements such the base station [102], the clusters [104], the user equipments [110], the small cells [106], the access points [108], the units, interfaces, modules and components.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

What is claimed is:

1. A method for determining a capacity utilisation of at least one of at least one cluster and a base station in a heterogeneous network, wherein the method is being performed by the base station, the method comprising:
    receiving at least one broadcast/unicast message from at least one user equipment, wherein
        the at least one user equipment belongs to the at least one cluster having at least one cluster identifier,
        the at least one broadcast message includes the at least one cluster identifier corresponding to said at least one, and
        the at least one broadcast message includes an uplink data and a downlink data of the at least one user equipment;
    generating a capacity utilisation list for said at least one cluster, wherein the capacity utilisation list is generated on the basis of said at least one cluster identifier;
    updating the capacity utilisation list with the uplink data and the downlink data of the at least one user equipment, wherein the capacity utilisation list is updated on the basis of the at least one cluster identifier; and
    determining a capacity utilisation for at least one of each of the at least one cluster and the base station, wherein the capacity utilisation is determined based on the uplink data and the downlink data received from the at least one user equipment.

2. The method as claimed in claim 1, further comprising, tagging the at least one user equipment with the at least one cluster identifier.

3. The method as claimed in claim 1, wherein the at least one cluster includes at least one of a wireless access point and a small cell.

4. The method as claimed in claim 1, wherein the cluster identifier is periodically broadcasted by the at least one wireless access point and the at least one small cell.

5. The method as claimed in claim 1, wherein the cluster identifier corresponds to one of a HESSID and a system information block information.

6. The method as claimed in claim 1, wherein the capacity utilisation list comprises one or more capacity values for each of the at least one cluster.

7. The method as claimed in claim 1, wherein the determination of the capacity utilisation further comprising:
    accumulating and aggregating uplink data and downlink data for each of the at least one user equipment, wherein the each of the at least one user equipment belongs to the at least one cluster.

8. A base station for determining a capacity utilisation of at least one of at least one cluster and a base station in a heterogeneous network, the base station comprising:
    a cellular radio configured to receive at least one broadcast/unicast message from at least one user equipment, wherein
        the at least one user equipment belongs to the at least one cluster having at least one cluster identifier,
        the at least one broadcast message includes the at least one cluster identifier corresponding to said at least one cluster, and
        the at least one broadcast message includes an uplink data and a downlink data of the at least one user equipment;
    a capacity utilisation module configured to
        generate a capacity utilisation list for said at least one cluster, wherein the capacity utilisation list is generated on the basis of said at least one cluster identifier; and
        updating the capacity utilisation list with the uplink data and the downlink data of the at least one user equipment, wherein the capacity utilisation list is updated on the basis of the at least one cluster identifier; and
    an analytics unit configured to determine a capacity utilisation for at least one of each of at least one cluster and the base station, wherein the capacity utilisation is determined based on the uplink data and the downlink data received from the at least one user equipment.

9. The system as claimed in claim 8, wherein the capacity utilisation module is further configured to tag the at least one user equipment with the at least one cluster identifier.

10. The system as claimed in claim 8, wherein the at least one cluster includes at least one of a wireless access point and a small cell.

11. The system as claimed in claim 8, wherein the cluster identifier is periodically broadcasted by the at least one wireless access point and the at least one small cell.

12. The system as claimed in claim 8, wherein the cluster identifier corresponds to one of a HESSID and a SIB information.

13. The system as claimed in claim 8, wherein the analytics unit is further configured to:
    accumulate and aggregate uplink data and downlink data for each of the at least one user equipment, wherein the each of the at least one user equipment belongs to the at least one cluster.

* * * * *